United States Patent [19]

Kajioka et al.

[11] Patent Number: 4,493,530
[45] Date of Patent: Jan. 15, 1985

[54] SINGLE POLARIZATION OPTICAL FIBERS

[75] Inventors: Hiroshi Kajioka, Hitachi; Toshihide Tokunaga, Kitaibaraki; Junkichi Nakagawa, Hitachi, all of Japan

[73] Assignee: Hitachi Cable, Ltd., Tokyo, Japan

[21] Appl. No.: 394,889

[22] Filed: Jul. 2, 1982

[30] Foreign Application Priority Data

Aug. 18, 1981 [JP] Japan .................. 56-129139

[51] Int. Cl.³ .............................................. G02B 5/172
[52] U.S. Cl. ............................. 350/96.34; 350/96.30; 350/96.33
[58] Field of Search ............... 350/96.29, 96.30, 96.33, 350/96.34

[56] References Cited

U.S. PATENT DOCUMENTS

| 4,179,189 | 12/1979 | Kaminow et al. | 350/96.33 |
| 4,274,854 | 6/1981 | Pleibel et al. | 350/96.30 X |
| 4,307,938 | 12/1981 | Dyott | 350/96.30 |
| 4,354,736 | 10/1982 | Maklad et al. | 350/96.30 X |
| 4,372,646 | 2/1983 | Strahan et al. | 350/96.31 |
| 4,426,129 | 1/1984 | Matsumura et al. | 350/96.33 |

FOREIGN PATENT DOCUMENTS

| 1047810 | 2/1979 | Canada . | |
| 0032390 | 7/1981 | European Pat. Off. | 350/96.34 |
| 2012983 | 8/1979 | United Kingdom . | |

OTHER PUBLICATIONS

Ramaswamy et al., "Birefringence in Elliptically Clad . . . Fibers," *Appl. Optics*, Vol. 18, No. 24, Dec. 1979, pp. 4080–4084.

Primary Examiner—John D. Lee
Attorney, Agent, or Firm—Wenderoth, Lind & Ponack

[57] ABSTRACT

A single polarization optical fiber has an elliptical jacket composed of $SiO_2 + F_2O + P_2O_5$, whereby increase in transmission loss at a long wavelength band is prevented.

8 Claims, 4 Drawing Figures

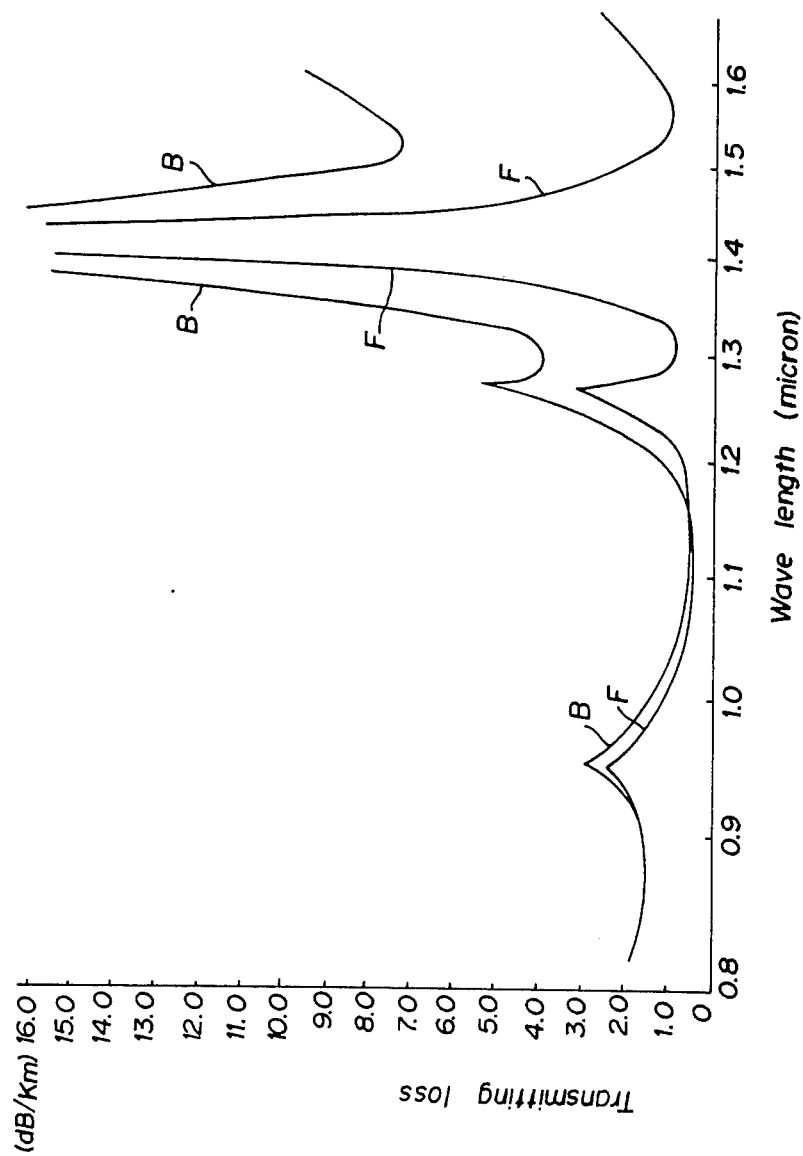

SINGLE POLARIZATION OPTICAL FIBERS

BACKGROUND OF THE INVENTION

The present invention relates to single polarization optical fibers, and more specifically to single polarization optical fibers in which an increase in light transmission loss at a long wavelength band is suppressed.

DESCRIPTION OF THE PRIOR ART

FIG. 1 is a sectional view showing a conventional single polarization optical fiber in which light-piping is effected without varying a single mode plane of polarization, and such single polarization optical fiber comprises a core 11 having refractive index $n_1$, an elliptical jacket 12 having refractive index $n_2$ ($n_1 > n_2$) and which surrounds the aforesaid core 11, a support 13 made of silica glass disposed on the outside of the aforesaid elliptical jacket 12, and a plastic jacket 14 being the outermost layer of the optical fiber. Materials of the core 11 and the elliptical jacket 12 are indicated as follows.

| Construction | Materials |
| --- | --- |
| Core 11 | (a) $SiO_2$ |
| | (b) $SiO_2 + B_2O_3$ |
| | (c) $SiO_2 + GeO_2$ |
| | (d) $SiO_2 + P_2O_5$ |
| Elliptical Jacket 12 | (a) $SiO_2 + B_2O_3$ |
| | (b) $SiO_2 + GeO_2 + B_2O_3$ |

According to such single polarization optical fibers, anisotropic distortion generated due to a difference in thermal expansion coefficients between materials of the elliptical jacket 12 and the support 13 is applied to the core 11 so that a difference in propagation constants in two directions perpendicular to one another and at right angles to the transmitting direction can be increased, and thus single mode light-piping can be effected without varying the plane of polarization.

However, in accordance with such conventional single polarization optical fibers, although light-piping with a transmission loss lower than a predetermined value can be effected at a short wavelength band of, for example, wavelength $\lambda = 0.63$ $\mu$m, if wavelength $\lambda$ = around 1.3 $\mu$m, there arises such a situation where the transmission loss cannot be suppressed below the predetermined value for the following reason. This is because the conventional single polarization optical fibers are affected by a B—O bond due to $B_2O_3$ in the elliptical jacket 12 and OH group diffusing from a silica glass tube which will be the support 13 into the elliptical jacket 12 at, for example, a high vapor deposition temperature of 1500° C. or more at the time when a material of the elliptical jacket 12 is vapor-deposited on the inner surface of the silica glass tube in the case where the optical fibers are fabricated in accordance with, for instance, a chemical vapor deposition (CVD) process.

Furthermore there is also such a case that the elliptical jacket 12 cannot be formed into an oval with a prescribed ellipticity, because the elliptical jacket has also a tendency of forming in circular shape due to its own surface tension in the event that the conventional single polarization optical fibers are fabricated in accordance with the above-mentioned CVD process.

SUMMARY OF THE INVENTION

Accordingly, an object of the present invention is to provide single polarization optical fibers in which an increase in light transmission loss at a long wavelength band is suppressed.

Another object of the present invention is to provide single polarization optical fibers each comprising an elliptical jacket layer having a prescribed ellipticity.

BRIEF DESCRIPTION OF THE INVENTION

The single polarization optical fiber according to the present invention comprises a circular core having a predetermined first refractive index; a circular cladding having a second refractive index smaller than that of the aforesaid circular core; an elliptical jacket containing $F_2O$ for decreasing the refractive index and $P_2O_5$ for lowering the softening temperature, having an intermediate third refractive index between the aforesaid first and second refractive indices, and being positioned on the outer periphery of the aforesaid circular cladding; and a support disposed on the outside of the aforesaid elliptical jacket.

BRIEF DESCRIPTION OF THE DRAWINGS

FIG. 4 is a graphical representation illustrating wavelength characteristics of an embodiment of the single polarization type optical fiber according to the present invention and a comparative example thereof.

DETAILED DESCRIPTION OF THE INVENTION

Figure 1:
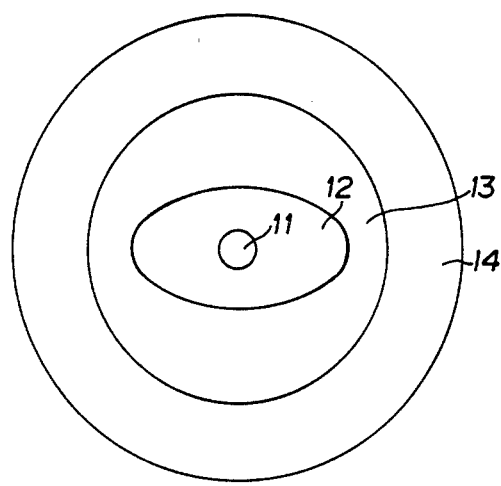
FIG. 1 is a sectional view showing a conventional single polarization type optical fiber.
Figure 2:
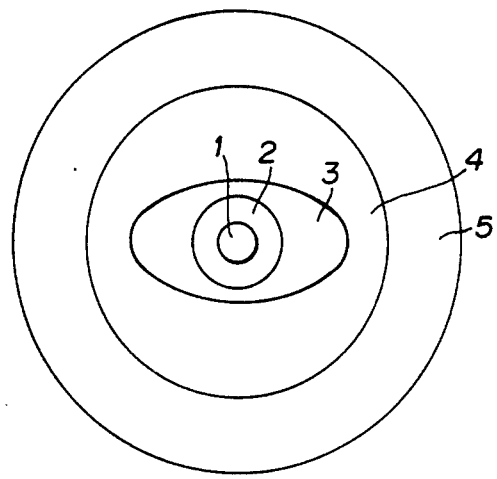
FIG. 2 is a sectional view showing an embodiment of the single polarization type optical fiber according to the present invention.
Figure 3:
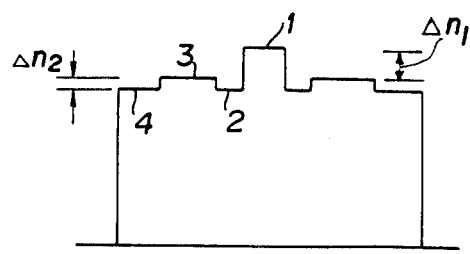
FIG. 3 is an explanatory view illustrating a distribution of refractive index of the single polarization type optical fiber in FIG. 2.

In FIGS. 2 and 3, compositions of a core 1, a circular cladding 2, an elliptical jacket 3, and a support 4 are $GeO_2$—$SiO_2$, $SiO_2$, $P_2O_5$—$F_2O$—$SiO_2$, and $SiO_2$, respectively, and a plastic jacket 5 is disposed on the outside of the support 4. In such arrangement, a single mode optical fiber having a difference in refractive indices $\Delta n_1 \approx 0.5\%$ between the core 1 and the elliptical jacket 3, a difference in refractive indeces $\Delta n_2 \approx 0.05\%$ between the elliptical jacket 3 and the circular cladding 2, a core diameter of 6 $\mu$m, a thickness of the circular cladding 2 of 3 $\mu$m, an outer diameter of 125 $\mu$m, and a cut-off wavelength of 1.2 $\mu$m was obtained.

In case of single mode optical fibers, an electromagnetic field component (i.e. the field component $\vec{E}$) leaks to the cladding at normalized frequency, unlike the case of multimode optical fibers, so that a thickness of the circular cladding 2 is made to be the one corresponding to the radius of the core 1.

Meanwhile, factors determining the single polarization property are the ellipticity of the ellipical jacket and the amount of fluorine. In general, when such amount of fluorine is increased, the single polarization property is improved.

The most important point of the present invention resides in that the elliptical jacket does not substantially contain $B_2O_3$, but $F_2O$ instead, whereby an increase in transmission loss due to a B—O bond at a long wavelength is suppressed.

(1) As is understood from the above embodiment, the refractive index of the elliptical jacket 3 is smaller than that of the core 1 and larger than that of the circular cladding 2.

(2) The core is of glass consisting of $SiO_2$ and an additive for elevating refractive index, such as $GeO_2$, and the circular cladding 2 consists of high purity $SiO_2$.

(3) The elliptical jacket 3 consists of $P_2O_5$—$F_2O$—$SiO_2$ system glass.

(4) The support 4 consists of glass containing $SiO_2$ as the principal constituent, and the refractive index thereof is smaller than that of the elliptical jacket 3.

The reason why such construction as mentioned above is excellent will be described in detail hereinbelow.

In single mode optical fibers, even if a thickness of the circular cladding 2 is preset as in the above embodiment, the cut-off wavelength varies dependent upon slight changes in the core diameter and refractive index, and as a result the normalized frequency at its operating wavelength varies so that there is occasionally such a case where an electromagnetic field component leaks to the elliptical jacket 3. If such electromagnetic field component is in a transmitting mode, a part of the wave energy is absorbed by means of the elliptical jacket 3, and it results in an increase in transmission loss.

For the sake of preventing such increase in transmission loss, undesirable modes are subjected to leakage and, for this purpose, a refractive index of the elliptical jacket 3 is made larger than that of the circular cladding 2 so as to be capable of transmitting only a low loss mode when the electromagnetic field component concentrates in the central portion of the core 1.

On the other hand, high purity $SiO_2$ is employed as the circular cladding 2, and as a result the viscosity of the circular cladding 2 is made sufficiently higher than that of the elliptical jacket 3 disposed on the outside of the circular cladding 2. Such arrangements are, of course, important in view of the above-mentioned transmission characteristics, besides in view of the fabrication of single polarization optical fibers. Namely, though there are various processes for fabricating optical fibers, the CVD process is comparatively popular, and in this process the shape of the elliptical cladding is formed by means of reduced pressure at high temperatures. Furthermore, in case of fabricating optical fibers according to other processes, for example, in the case of a rod-in-tube process, such pressure reducing step is also adopted and thereafter preformed materials are subjected to wire drawing at high temperatures to obtain optical fibers.

In this case, important is the fact that the viscosity of the circular cladding 2 is higher, while the viscosity of the elliptical jacket 3 is lower, in order to make only the elliptical jacket 3 oval and to make both the circular cladding 2 and core 1 circular. For this reason, the elliptical jacket 3 contains 5-20 mol % of $F_2O$ and $P_2O_5$ dopants.

Wavelength characteristics of an optical fiber which has experimentally been fabricated in accordance with the above described construction in which the elliptical jacket 3 consists of about 15 mol % of $P_2O_5$, about 5 mol % of $F_2O$ and about 80 mol % of $SiO_2$ are represented by curve F in FIG. 4.

Such optical fiber could be made low loss with such a value of 0.7 dB/Km at $\lambda = 1.2$ μm, and 0.8 dB/Km at $\lambda = 1.3$ μm.

An ellipticity $\epsilon$ of the optical fiber of the trial fabrication was $\epsilon = 60\%$, and a coupling length thereof was about 4 mm ($\lambda = 1.3$ μm). In this connection, a definition of $\epsilon$ is given in accordance with the equation $$\epsilon = \frac{\text{major axis} - \text{minor axis}}{\text{major axis} + \text{minor axis}} \times 100 (\%).$$

For comparison, wavelength characteristics of another optical fiber which has been fabricated in accordance with substantially identical construction, dimension and shape to those of the above described optical fiber, in which the elliptical jacket 3 consists of about 5.6 mol % of $P_2O_5$, about 5.6 mol % of $B_2O_3$ and about 88.8 mol % of $SiO_2$ are represented by curve B in FIG. 4.

The present invention relates to a construction of a single polarization type optical fiber, and therefore the process for fabricating the same is not specifically limited, but such optical fiber can be obtained, for example, by the manner as described hereinbelow.

Fluoride is introduced into the interior of an $SiO_2$ tube of not so high purity together with $POCl_3$, $SiCl_4$ and the like, and the tube is heated from the outside thereof to form an oxide film.

This film is the one consisting of $P_2O_5$—$F_2O$—$SiO_2$ system glass and which will be the elliptical jacket 3.

Thereafter $SiO_2$ is deposited on the inner surface of the tube to form a film, and further a film of $GeO_2$—$SiO_2$ system glass is similarly formed thereon.

The resulting tube is heated at a high temperature of around 1900° C. and the interior of the tube is subjected to pressure reduction thereby collapsing the tube to fabricate a preformed member. The preform thus obtained is heated to a high temperature of around 2100° C. and is subjected to wire drawing. As a result, a prescribed single polarization type optical fiber in which only the low viscosity $P_2O_5$—$F_2O$—$SiO_2$ system glass film, i.e. the elliptical jacket 3, is formed oval, while the other high viscosity parts are formed circular due to surface tension, can be obtained.

Now, in the aforementioned embodiment, it is to be noted that the plastic jacket 5 may be omitted.

Although the present invention has been described with reference to preferred embodiments thereof, many modifications and alternations may be made within the spirit and scope of the present invention.

What is claimed is:

1. A single polarization optical fiber comprising a circular core having a refractive index $n_1$, a circular cladding outside the circular core and having a refractive index $n_2$ that is less than $n_1$, and an elliptical jacket outside the circular cladding and having a refractive index $n_3$ that is between $n_1$ and $n_2$ and having a softening point below the softening point of the cladding, said jacket being formed of a fluoro-phosphosilicate glass.

2. A fiber according to claim 1, further comprising a support outside said jacket and having a refractive index $n_4$ which is less than $n_3$.

3. A fiber according to claim 1, in which the cladding is formed of substantially pure $SiO_2$, the core is formed of a glass of $SiO_2$ and a component for increasing refractive index.

4. A fiber according to claim 3, in which the core is formed of a germania containing glass.

5. A fiber as claimed in claim 1, wherein said jacket contains $F_2O$ for decreasing refractive index and $P_2O_5$ for lowering the softening temperature.

6. A fiber as claimed in claim 1, wherein said elliptical jacket contains 5-20 mol% of $F_2O$ and $P_2O_5$.

7. A single polarization optical fiber comprising:
a circular core having a predetermined first refractive index;
a circular cladding positioned on the outside of said circular core and having a second refractive index smaller than said first refractive index;
an elliptical jacket positioned on the outside of said circular cladding containing $F_2O$ for decreasing refractive index and $P_2O_5$ for lowering softening temperature and having an intermediate third refractive index between said first and second refractive indices; and
a support positioned on the outside of said elliptical jacket.

8. A single polarization optical fiber as claimed in claim 7, wherein said elliptical jacket contains 5–20 mol % of $F_2O$ and $P_2O_5$.

* * * * *